United States Patent
Desy et al.

(10) Patent No.: US 6,969,925 B2
(45) Date of Patent: Nov. 29, 2005

(54) SHIP LOCK ELECTRICAL ENERGY GENERATION

(75) Inventors: Norman Desy, Laval (CA); Pekka Virta, Tampere (FI)

(73) Assignee: General Electric Canada Inc., Mississauga (CA)

( * ) Notice: Subject to any disclaimer, the term of this patent is extended or adjusted under 35 U.S.C. 154(b) by 153 days.

(21) Appl. No.: 10/378,624

(22) Filed: Mar. 5, 2003

(65) Prior Publication Data

US 2004/0108731 A1 Jun. 10, 2004

(30) Foreign Application Priority Data

Dec. 5, 2002 (CA) .............................. 2413571

(51) Int. Cl.⁷ .............................................. F03B 13/00
(52) U.S. Cl. .............................. 290/54; 290/43; 60/398
(58) Field of Search ...................... 290/54, 43; 60/398

(56) References Cited

U.S. PATENT DOCUMENTS

| | | | |
|---|---|---|---|
| 127,389 A | | 5/1872 | Townsend |
| 882,501 A | | 3/1908 | Jamison |
| 4,310,769 A | | 1/1982 | Mazzone |
| 4,443,707 A | * | 4/1984 | Scieri et al. .................. 290/4 R |
| 4,475,334 A | * | 10/1984 | Kuwabara ..................... 60/398 |
| 4,674,279 A | * | 6/1987 | Ali et al. ....................... 60/398 |
| 4,694,189 A | * | 9/1987 | Haraguchi et al. ......... 290/40 C |
| 4,754,156 A | * | 6/1988 | Shiozaki et al. ............... 290/52 |
| 4,806,781 A | * | 2/1989 | Hochstetter ................... 290/43 |
| 4,920,277 A | * | 4/1990 | Kuwabara et al. ......... 290/40 C |
| 5,389,821 A | * | 2/1995 | Moulliet ..................... 290/1 R |
| 5,825,094 A | * | 10/1998 | Hess ........................... 290/54 |
| 6,000,880 A | * | 12/1999 | Halus ........................... 405/52 |
| 6,146,096 A | | 11/2000 | Winkler |

FOREIGN PATENT DOCUMENTS

| | | | |
|---|---|---|---|
| BE | 1 013 606 A | 4/2002 | |
| CA | 1148445 | 6/1983 | |
| DE | 483 766 C | 10/1929 | |
| DE | 838 275 C | 5/1952 | |
| DE | 1130766 | 5/1962 | |
| GB | 2298004 A | * 8/1996 | ........... F03B/13/26 |

* cited by examiner

Primary Examiner—Joseph Waks

(57) ABSTRACT

A ship lock utilizes a hydraulic turbine and/or pump-turbine to regulate the discharge flow rates through the ship lock to an approximate constant value during the majority of the water transfer cycle resulting in a diminishing of total energy of head losses and to enable the recuperation of the unused hydraulic energy for generation as electricity. The difference in water levels on opposite sides of the ship lock constitutes potential hydraulic energy. By regulating the discharge, the total head losses over a given period of time diminish very significantly, thus giving an opportunity for optimization of hydraulic energy recuperation.

16 Claims, 2 Drawing Sheets

SHIP LOCK ELECTRICAL ENERGY GENERATION

FIELD OF THE INVENTION

The present invention relates to a method and system for generating electrical energy during the changing of the water levels in ship locks.

BACKGROUND OF THE INVENTION

A ship lock, often in a canal system, operates to connect two bodies of water at different water levels by alternate lowering and raising of the water level in the ship lock. Ship locks are operated using the gravity force to transfer a volume of water from one side of a lock gate to its other side. Once water levels have equilibrated, the lock gate can be opened for the ship to move through the gate.

U.S. Pat. No. 4,310,769 issued Jan. 12, 1982 teaches a ship lock system having one or more underground hydroelectric pumped-storage units which generate electrical energy. Water from the ship lock is drained to a lower reservoir when the ship lock water level is lowered. The water passes through a penstock and past a pump-turbines to generate electrical energy. The reservoir collects the water instead of allowing the water to be lost downstream. The pump-turbines then pump the water from the reservoir upward into the ship lock through the penstocks to raise the water level in the ship lock. The electrical power for accomplishing the pumping action can be supplied from other conventional energy sources as well as from tidal, wind, solar and other emerging energy sources. Hence water is conserved by the use of the pump-turbine. While this operation conserves water, it is a net consumer of electricity as the electricity generated by lowering the water level in the ship lock will be less than the electricity needed to pump the water back up into the ship lock against the forces of gravity and other losses.

German patent application DE 11 30 766 published May 30, 1962, discloses a power station located next to a lock having a pump-turbine for enabling faster and cheaper operation of the lock where one of the generators of the power station can be used to speed up the lock operation.

However, neither of these two patents teach the net recuperation of the unused hydraulic energy to generate electricity. In a traditionally operated ship lock, once the operating valves are opened, the free discharge of water through the system is proportional to the square root of the differential head from the two sides of the lock gate. Thus, the discharge rate is usually high in the beginning, and then diminishes until the discharge rate becomes relatively small towards the end of the water transfer cycle making it difficult to recuperate hydraulic energy for generation of electricity. Hence there is a need to be able to have a net recuperation of unused hydraulic energy to generate electricity which takes into consideration the problems associated with changes in the discharge rate of the water flow.

SUMMARY OF THE INVENTION

The present invention relates to the use of a hydraulic turbine and/or pump-turbine to regulate the discharge flow rates in ship locks to an approximate constant value during the majority of the water transfer cycle resulting in a diminishing of total energy of head losses and to enable the recuperation of the unused hydraulic energy for generation as electricity. The difference in water levels on opposite sides of the ship lock constitutes potential hydraulic energy. In the traditional operation of locks, all of this energy is dissipated into head losses. The system of the present invention regulates the discharge through the locks in the downstream direction by means of hydraulic turbines and/or pump-turbines. By regulating the discharge, the total head losses over a given period of time diminish very significantly, thus giving an opportunity for optimization of hydraulic energy recuperation.

In accordance with the present invention there is provided a system for generating electrical power comprising at least one ship lock for connecting a first body of water and a second body of water. The system includes the ship lock having a pair of spaced apart gates for permitting passage of ships to and from the ship lock when the gates are alternately opened and closed. The system includes at least one fluid communicating passageway for coupling the ship lock to at least one of the first body of water and second body of water. A turbine is positioned in fluid flow communication with the fluid communicating passageway for generating electrical power when water flows through the at least one fluid communicating passageway. The system also includes at least one turbine operating controller for regulating discharge flow rate of water through the turbine to be within a predetermined range of flow rates determined as a function of one or more of water time transfer requirements, maximum turbine capability and network power requirements.

It should be understood that the term fluid communicating passageway is used throughout the disclosure and claims to refer to a passageways, such as, for example, a culvert that permits water to flow between the bodies of water and/or through the ship lock. The passageway may either be above ground or underground. Further it should be understood that the fluid communicating passageway may be an open, partially enclosed or fully enclosed fluid communicating passageway.

Preferably, the turbine operation control means regulates the discharge flow rate of water through the fluid communicating passageway to fall within a predetermined constant range during a substantial part of the lock water level raising or lowering cycle. Further, it is preferred that the turbine is a pump-turbine capable of operating both in a turbine energy generating mode and a pump mode. The turbine operating control means switches the pump turbine into the pump mode to maintain the discharge flow rate within the predetermined flow range of flow rates before, or when, the discharge flow rate falls below the predetermined range of flow rates as the head decreases. This preferred feature has the advantage of shortening the transfer cycle when compared with an uncontrolled state. This latter pump mode of operation occurs for a relatively short period of time compared to the initial generating mode of operation and a net electrical energy generation is achieved.

In accordance with another aspect of the present invention there is provided a method for generating electrical energy with the use of a ship lock for connecting a first body of water and a second body of water having respective water levels. The method comprises changing the water level of the ship lock to the water level of one of the first body of water and second body of water through an electrical energy generation turbine at a predetermined discharge rate range as a function of one or more of time transfer requirements, maximum turbine capability, and network power requirements.

Preferably, the predetermined discharge rate range is controlled during a substantial part of a water level changing period to generate a constant electrical power.

The method preferably comprises the steps of:

raising the water level of the ship lock through a first electrical energy generating turbine to that of the first body of water within a first predetermined discharge rate range as a function of one or more of time transfer requirements, maximum turbine capability, and network power requirements; and, lowering the water level of the ship lock through a second electrical generating turbine to that of the second body of water within a second predetermined discharge rate range as a function of one or more of time transfer requirements, maximum turbine capability, and network power requirements.

The first and second predetermined discharge rate ranges are preferably independently controlled during a substantial part of a respective raising or lowering period to generate a first and second constant electrical power.

Preferably, the first and second predetermined discharge rate ranges are the same and the first and second constant electrical powers are the same.

Preferably, the first and second turbines are pump-turbines and the method further comprises the step of operating the first and second pump turbines in a pumping mode to maintain the discharge flow rates within the predetermined discharge flow rate ranges before, or when, the discharge flow rate falls below the predetermined discharge flow rate ranges.

BRIEF DESCRIPTION OF THE DRAWINGS

For a better understanding of the nature and objects of the present invention reference may be had to the accompanying diagrammatic drawings in which.

DESCRIPTION OF THE PREFERRED EMBODIMENTS

Figure 1:
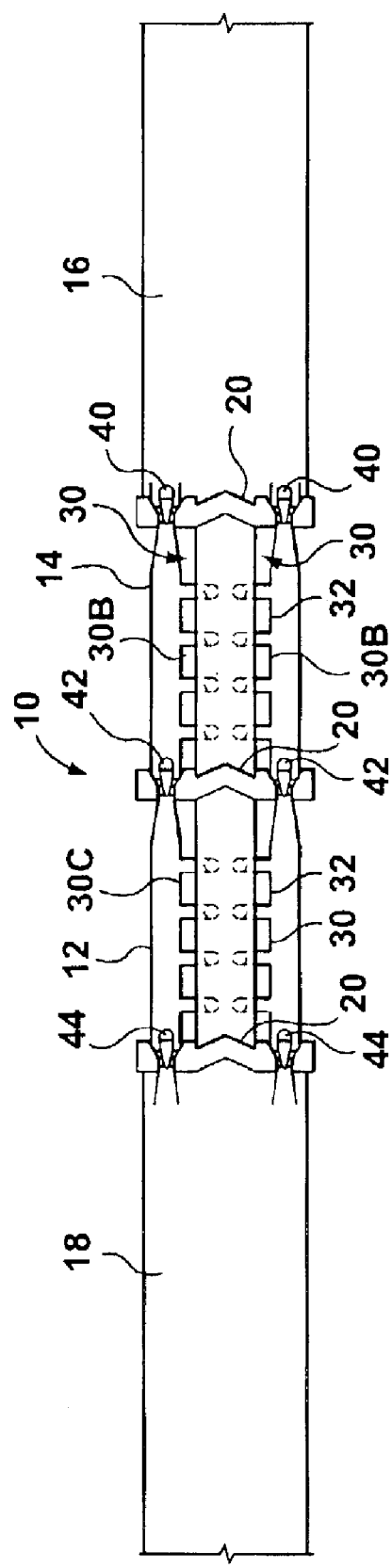
FIG. 1 is a plan view showing ship lock gates located between two bodies of water utilizing turbines to recuperate energy.
Figure 2:
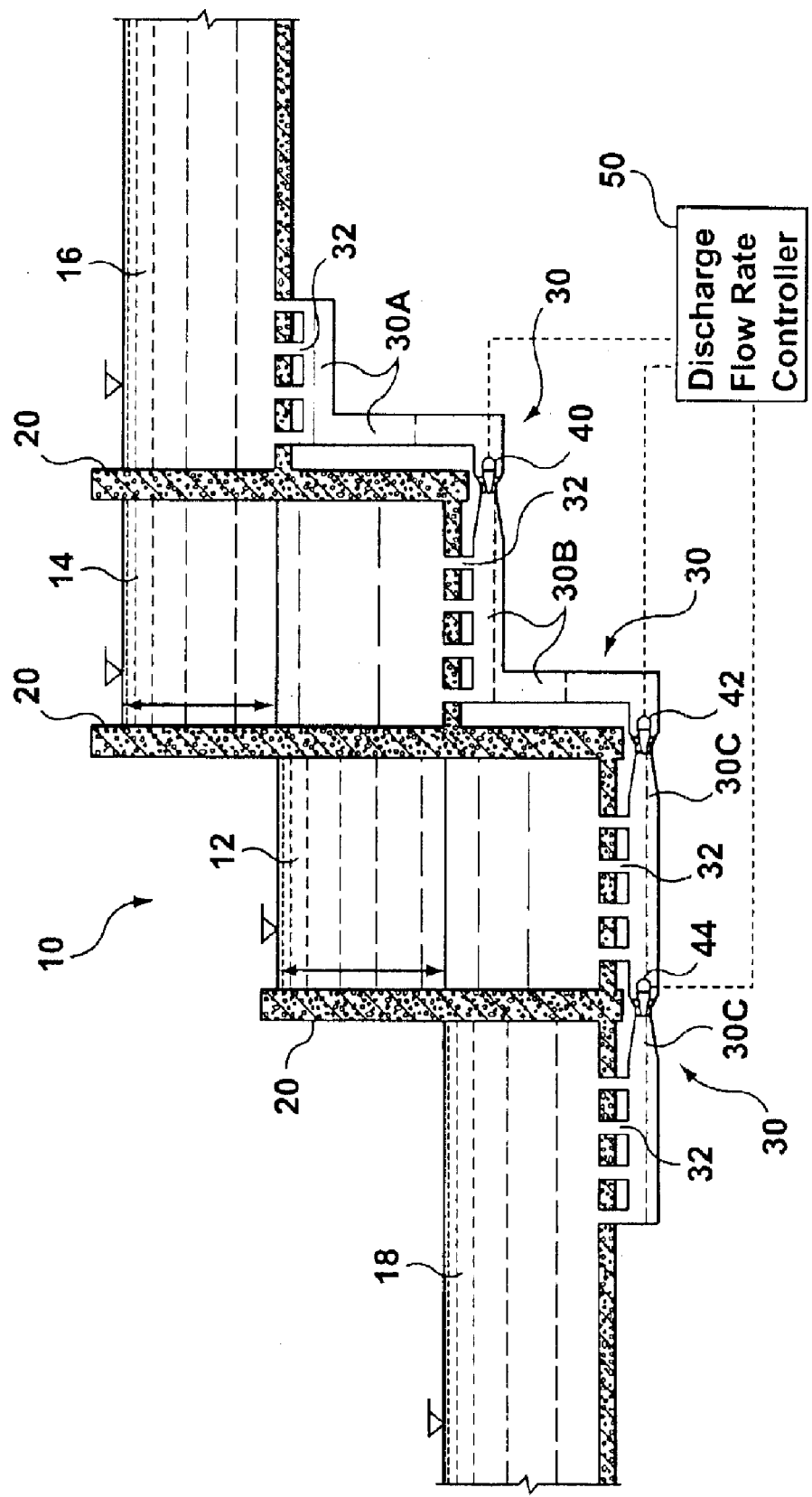
FIG. 2 is a side elevation view of the ship lock gates of FIG. 1.

Referring to FIGS. 1 and 2, there is shown a canal lock system 10 that utilizes two ship locks 12 and 14 respectively located between an upper body of water 16 and a lower body of water 18. It should be understood that the number of ship locks illustrated is two locks and that the number could be only one lock or three or more locks between the bodies of water 16 and 18.

Each ship lock 12 and 14 has a pair of spaced apart gates 20 for permitting passage of ships to and from the ship locks 12 and 14 when the gates are alternately opened and closed. Ship locks 12 and 14 share a common gate between them.

Between the bodies of water 16 and 18 extends fluid communicating passageways 30 for coupling the upper body of water 16 with the ship locks 12 and 14, and the lower body of water 18. The fluid communication passageways 30 are underground culverts that communicate with the bodies of water 16 and 18 and the ship locks 12 and 14 through controlled access ports 32 on the floor of the cannel lock system.

Referring to FIG. 2, the fluid communication passageways 30 are each shown to comprise a first passageway 30A that extends between the upper body of water 16 and the second ship lock 14. Located in fluid flow communication within each passageway 30A is a turbine 40. It should be understood from FIG. 1 that passageways 30A comprises two bypass passageways extending on opposing separate sides of the canal lock system. Two turbines 40 are shown preferably positioned below the gate 20; one turbine 40 in each of, or at the end of, passageway 30A. Second fluid communication passageways 30B are linked to passageways 30A and communicate through ports 32 the ship lock 14 with the ship lock 16. Further, a pair of turbines 42 are located below the common gate 20 between these ship locks 12 and 14; one turbine 42 in each of, or at the end of passageways 30B.

It should be understood that in this embodiment the ship locks 12 and 14 may in effect act as the lower or upper body of water respectively depending on whether or not you are looking at the ship locks 14 and 16 from the perspective of the lower body of water 18 or the upper body of water 16. That is to say, that ship lock 12 may represent the lower body of water in relationship to ship lock 14. Alternatively, the ship lock 14 may represent an upper body of water for the slip lock 12.

Additional fluid communication passageways 30C communicate between the ship lock 12 and the lower body of water 18 through the ports 32 by linking passageways 30B to a pair of turbines 44; one turbine 44 located in or at the end of one of each fluid communication passageway 30C.

It should be understood that the fluid communication passageways or underground culverts are all shown to extend beneath the floor of the canal system. However, it may be possible that the passageways could extend to the side or above floor of the canal lock system.

In the operation of the lock 12 and 14 shown in FIG. 2, the right most gates 20 of ship lock 14 can be opened and a ship may move between the ship lock 14 and the upper body of water 16. In this example of a ship moving from the upper body of water 16 to the lower body of water 18, gates 20 between ship lock 14 and 16 would be open and the ship would move into the ship lock 14. Thereafter this gate is closed. Next, the water level of ship lock 14 is lowered to that of the water level of ship lock 12. As the water level lowers in ship lock 14, water flows downstream through the fluid communication passageways 30B and 30C past turbines 42 and past turbines 44 into the lower body of water 18. During this period, the discharge flow rate is controlled by controller 50. As a result, the controller 50, which controls the operation of the turbines 40, 42, and 44, controls the discharge flow rate so that the hydraulic head losses associated with the lowering of the water level in ship lock 14 are converted through the turbines 42 and 44 into electrical energy.

Once the ship lock 14 is at the level of ship lock 12, the gates 20 between these two ship locks are opened and the ship is able to move into the ship lock 12. Thereafter these gates are closed and the water level in ship lock 12 is lowered by the water passing through ports 32 downstream through fluid communication passageways 30C and into ports 32 of the lower body of water 18. Again, the discharge flow rate is controlled by a discharge flow rate controller 50 in operation or conjunction with the turbines 44. When the water level in ship lock 12 is the same level as the lower body of water 18, the gates 20 between body of water 18 and ship lock 12 may be opened to permit the ship moves through the gates.

In the reverse operation, the ship lock 12 can be raised from it's lower level adjacent the level of the lower body of water 18 to it's upper level shown in FIG. 2 through the discharge of water downstream from the upper body of water 16 through passageways 30A and 30B and in through ports 32 below lock 12. As a result, the water flows downstream in passageways 30A and 30B past turbines 40 and 42. Again discharge flow rate controller 50 controls this rate of flow of water along these passageways 30A and 30B so that electrical energy is generated. Similarly the ship lock 14 may have it's water level raised from a lower level corresponding to the upper level of lock 12 to it's upper level corresponding to the level of body of water 16 by the downstream passage of water from the upper body of water 16 through passageways 30A and in through ports 32 in the floor of ship lock 14. This allows for water to flow in the fluid communication passageway past turbines 40.

In each of these stages, the passage of the water past the turbines 40, 42, and 44 results in power generation provided that the discharge flow rate remains within a predetermined range of rates. The discharge flow rate controller is a control device associated with the turbines 40, 42, and 44 that controls the operation of the turbines to regulate the discharge flow rate of water through the fluid communication passageways 30. This flow rate is within a predetermined range of flow rates which is determined as a function of one or more of the water time transfer requirements for transferring water from one upper body of water into a ship lock or from a ship lock into a lower body of water; as a function of the maximum turbine capability which is the ability of the turbine to pass water therethrough; or as a function of the network power requirements of the local power grid as to the need for power by the network. In the event that very low power by the network is required then the discharge flow rate controller would operate the turbine to have a lower flow rate. In the event that the network power requirements are not a significant factor, then the flow rates is the flow rate of the turbine may have at a maximum level in order to speed up the water time transfer requirements. However, these three functions are related to each other so as to determine the flow rate in the predetermined range of flow rate. It should be understood that this flow rate should fall within a predetermined range in order for there to be proper recuperation of electricity.

Preferably, the turbines are capable of operating both in a turbine energy generating mode and a pump mode. While in the energy generation mode at a constant flow rate determined by the lowering of the head, the turbines generate electricity. However, once the discharge rate starts to become significantly less such that the rates fell below a predetermined level, the turbines are then switched by controller 50 to operate in a pump mode so as to drive the water from the higher body of water into the lower body of water at a particular flow rate so as to reduce the water time transfer requirements between the bodies of water.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for generating electrical power comprising:
   at least one ship lock for connecting a first body of water and a second body of water, and the ship lock having a pair of spaced gates for permitting passage of ships to and from the ship lock when the gates are alternately opened and closed;
   at least one fluid communicating passageway for coupling the ship lock with at least one of the first body of water and the second body of water to permit water to flow between the ship lock and the at least one of the first body of water and the second body of water;
   a turbine positioned in fluid flow communication with the fluid communicating passageway for generating electrical power when water flows through the at least one fluid communicating passageway between the ship lock and the at least one of the first body of water and the second body of water; and
   a turbine operating controller for regulating discharge flow rate of water through the turbine to be within a predetermined range of flow rates determined as a function of one or more of water time transfer requirements, maximum turbine capability and network power requirements.

2. The system of claim 1 wherein the second body of water is at a level below the first body of water, the at least one fluid communicating passageway coupling the first body of water to the ship lock, and the turbine generating electrical power when water flows downstream through the at least one fluid communication passageway to raise the level of water in the ship lock to the first body of water during a ship lock water level raising cycle.

3. The system of claim 2 wherein the turbine operation controller regulates the discharge flow rate of water through the fluid communicating passageway to fall within a predetermined constant range during a substantial part of the lock water level raising cycle.

4. The system of claim 3 wherein the turbine is a pump-turbine capable of operating both in a turbine energy generating mode and a pump mode, said turbine operating controller switching the pump-turbine into the pump mode to maintain the discharge flow rate within the predetermined flow range of flow rates before, or when, the discharge flow rate falls below the predetermined range of flow rates.

5. The system of claim 1 wherein the second body of water is at a level below the first body of water, the at least one fluid communicating passageway coupling the ship lock to the second body of water and the turbine generating electrical power when water flows downstream through the at least one fluid communicating passageway to lower the level of water in the ship lock to the second body of water during a ship lock water lowering cycle.

6. The system of claim 5 wherein the turbine operation controller regulates the discharge flow rate of water through the fluid communicating passageway to fall within a predetermined constant range during a substantial part of the lock water level lowering cycle.

7. The system of claim 6 wherein the turbine is a pump-turbine capable of operating both in a turbine energy generating mode and a pump mode, said turbine operating controller switching the pump-turbine into the pump mode to maintain the discharge flow rate within the predetermined flow range of flow rates before, or when, the discharge flow rate falls below the predetermined range of flow rates.

8. A system for generating electrical power comprising:
   at least one ship lock for connecting a first body of water and a second body of water at a water level below the first body of water, and the ship lock having a pair of spaced gates for permitting passage of ships to and from the ship lock when the gates are alternately opened and closed;
   at least one first fluid communicating passageway for coupling the first body of water to the ship lock;
   a first turbine positioned in the first fluid communicating passageway for generating electrical power when water flows downstream through the at least one first fluid communicating passageway to raise the level of water in the ship lock to that of the first body of water during a ship lock water level raising cycle;

at least one second fluid communicating passageway coupling the ship lock to the second body of water;

a second turbine positioned in the second fluid communicating passageway for generating electrical power when water flows downstream through the at least one second fluid communicating passageway to lower the level of water in the ship lock to the second body of water during a ship lock water lowering cycle; and, at least one turbine operating controller for regulating discharge flow rate of water through the at least one first and second fluid communicating passageways and corresponding first and second turbines to be within a predetermined range of flow rates determined as a function of one or more of water time transfer requirements, maximum turbine capability and network power requirements.

9. The system of claim 8 wherein the turbine operation controller regulates the discharge flow rate of water independently through each of the first and second fluid communicating passageways to each fall within a predetermined range of flow rates during a substantial part of the respective lock water level lowering cycle or raising cycle.

10. The system of claim 9 wherein the first and second turbines are each a pump-turbine capable of operating in both a turbine energy generating mode and a pump mode, said turbine operating controller switching the pump-turbine into the pump mode to maintain the discharge flow rate within the predetermined range of flow rates before, or when, the discharge flow rate falls below the predetermined range of flow rates.

11. A method for generating electrical energy with the use of at least one ship lock for connecting a first body of water and a second body of water having respective water levels and having an electrical energy generating turbine positioned in at least one fluid communicating passageway that couples the ship lock with at least one of the first body of water and the second body of water to permit water to flow between the ship lock and the at least one of the first body of water and the second body of water; the method comprising:

changing the water level of the ship lock to the water level of one of the first body of water and second body of water through the electrical energy generating turbine at a predetermined discharge rate range which is a function of one or more of time transfer requirements, maximum turbine capability, and network power requirements.

12. The method of claim 11 wherein the predetermined discharge rate range is controlled during a substantial part of a water level changing period to generate a first constant electrical power.

13. The method of generating electrical energy with the use of at least one ship lock for connecting a first body of water and a second body of water at a water level below the first body of water; comprising:

raising the water level of the ship lock through a first electrical energy generating turbine to that of the first body of water within a first predetermined discharge rate range as a function of one or more of time transfer requirements, maximum turbine capability, and network power requirements; and, lowering the water level of the ship lock through a second electrical generating turbine to that of the second body of water within a second predetermined discharge rate range as a function of one or more of time transfer requirements, maximum turbine capability, and network power requirements.

14. The method of claim 13 wherein the first and second predetermined discharge rate ranges are independently controlled during a substantial part of a respective raising or lowering period to generate a first and second constant electrical power.

15. The method of claim 14 wherein the first and second predetermined discharge rate ranges are the same and the first and second constant electrical powers are the same.

16. The method of claim 15 wherein the first and second turbines are pump-turbines and the method further comprises:

operating the first and second pump turbines in a pumping mode to maintain the discharge flow rates within the predetermined discharge flow rate ranges before, or when, the discharge flow rate falls below the predetermined discharge flow rate ranges.

* * * * *